(12) United States Patent
Chiba et al.

(10) Patent No.: US 12,722,584 B2
(45) Date of Patent: Sep. 1, 2026

(54) VEHICLE CONTROL SYSTEM

(71) Applicant: HONDA MOTOR CO., LTD., Tokyo (JP)

(72) Inventors: Tetsuhiro Chiba, Tokyo (JP); Natsuki Ehara, Tokyo (JP); Ryo Sakai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/040,867

(22) Filed: Jan. 30, 2025

(65) Prior Publication Data

US 2025/0249851 A1 Aug. 7, 2025

(30) Foreign Application Priority Data

Feb. 2, 2024 (JP) ................................ 2024-014577

(51) Int. Cl.
*B60R 16/033* (2006.01)
*B60L 58/12* (2019.01)
*H04W 4/48* (2018.01)

(52) U.S. Cl.
CPC ............ *B60R 16/033* (2013.01); *B60L 58/12* (2019.02); *H04W 4/48* (2018.02)

(58) Field of Classification Search
CPC ......... B60R 16/033; B60L 58/12; H04W 4/48
See application file for complete search history.

(56) References Cited

U.S. PATENT DOCUMENTS

2013/0127400 A1* 5/2013 Oh ......................... B60L 58/20 320/104
2016/0137092 A1* 5/2016 Thieme ............... B60W 30/192 307/10.6
2025/0279669 A1* 9/2025 Murata ..................... H02J 7/14

FOREIGN PATENT DOCUMENTS

JP 2023-142056 A 10/2023

* cited by examiner

*Primary Examiner* — Ryan Johnson
*Assistant Examiner* — Esayas G Yeshaw
(74) *Attorney, Agent, or Firm* — Paratus Law Group, PLLC

(57) ABSTRACT

A vehicle control system includes: in-vehicle ECUs provided according to positions within a vehicle or functions of the vehicle; and an integrated ECU configured to control the in-vehicle ECUs, the in-vehicle ECUs include an ECU capable of communicating with an auxiliary battery sensor configured to detect a state of an auxiliary battery, the auxiliary battery sensor is configured to transmit the state of the auxiliary battery to the integrated ECU via the ECU capable of communicating with the auxiliary battery sensor, and when starting the vehicle, the integrated ECU secures communication in the vehicle, and activates the ECU capable of communicating with the auxiliary battery sensor, and starts communication of the auxiliary battery sensor in parallel.

9 Claims, 4 Drawing Sheets

V
1
3
2
LOW-VOLTAGE BATTERY
BL
VEHICLE CONTROL SYSTEM
10
VEHICLE AUXILIARY DEVICE
31
VOLTAGE CONVERTER
4
IN-VEHICLE CHARGER
22
POWER CONVERTER
21
M
W
HIGH-VOLTAGE BATTERY
BH

VEHICLE CONTROL SYSTEM

CROSS-REFERENCE TO RELATED APPLICATION

This application is based on and claims priority under 35 USC 119 from Japanese Patent Application No. 2024-014577 filed on Feb. 2, 2024.

TECHNICAL FIELD

The present invention relates to a vehicle control system including an in-vehicle ECU and an integrated ECU that controls the in-vehicle ECU.

BACKGROUND ART

In recent years, efforts to realize a low-carbon society or a decarbonized society have become active, and research and development on electrification techniques have been conducted to reduce $CO_2$ emission and improve energy efficiency in vehicles.

A vehicle control system of an electric vehicle includes in-vehicle ECUs such as a front ECU and a center ECU provided according to positions of a vehicle and an ADASECU and an IVIECU provided according to functions, and an integrated ECU that integrally controls the plurality of in-vehicle ECUs.

For example, JP2023-142056A discloses that an integrated ECU is communicably connected to a plurality of in-vehicle ECUs and performs overall control related to a vehicle based on information output from each in-vehicle ECU.

SUMMARY OF INVENTION

In recent years, since the number of in-vehicle ECUs mounted on a vehicle has increased, there is a concern that a startup time at the time of startup of the vehicle may be extended. On the other hand, as vehicles become more sophisticated, a large number of high-performance microcomputers (hereinafter, also referred to as "microcomputers") are mounted on in-vehicle ECUs. Power consumption and dark currents during stop of the vehicle increase in order to drive these microcomputers, which causes battery exhaustion and deterioration of fuel efficiency. Therefore, when starting the vehicle, it is necessary to grasp a state of the battery at an early stage and perform necessary charging.

The present invention provides a vehicle control system capable of shortening a startup time of a vehicle.

An aspect of the present invention is a vehicle control system including:

- in-vehicle ECUs provided according to positions or functions of a vehicle; and
- an integrated ECU configured to control the in-vehicle ECUs, in which
- the in-vehicle ECUs include an ECU capable of communicating with an auxiliary battery sensor configured to detect a state of an auxiliary battery,
- the auxiliary battery sensor is configured to transmit a state of the auxiliary battery to the integrated ECU via the ECU, and
- when starting the vehicle, the integrated ECU
  - secures communication in the vehicle, and
  - activates the ECU, and starts communication of the auxiliary battery sensor in parallel.

An aspect of the present invention is a vehicle control system including:

- an integrated ECU configured to integrally control in-vehicle ECUs provided according to positions or functions of a vehicle, in which
- the in-vehicle ECUs include a relay ECU capable of communicating with an auxiliary battery sensor configured to detect a state of an auxiliary battery, and
- when the integrated ECU is activated, the integrated ECU transmits an activation request to the relay ECU, and transmits a communication start request to the auxiliary battery sensor via the relay ECU.

According to the present invention, it is possible to start the vehicle at an early stage.

DETAILED DESCRIPTION OF THE INVENTION

Hereinafter, an embodiment of the present invention will be described with reference to the accompanying drawings.

Figure 1:
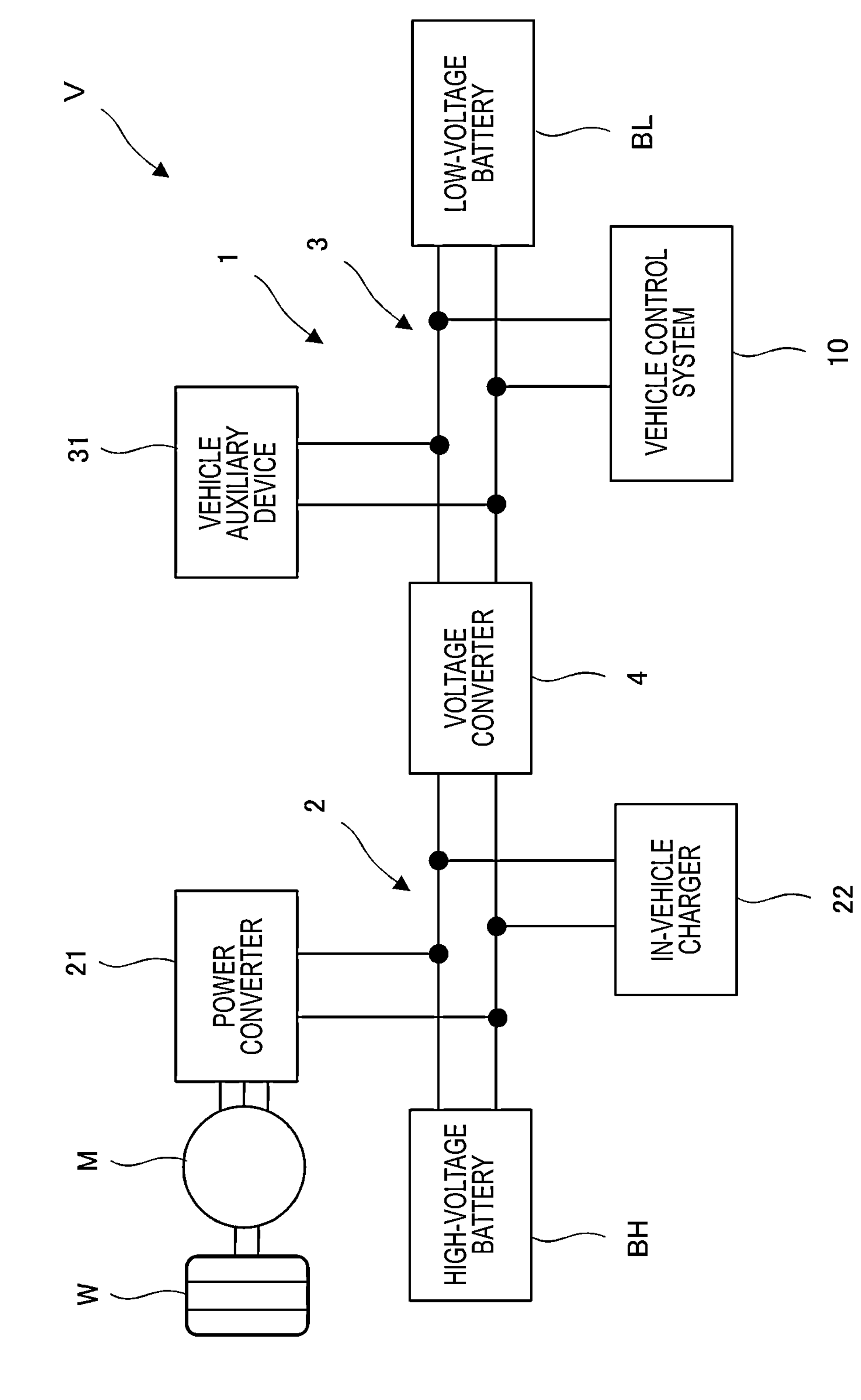
FIG. 1 is a diagram illustrating a configuration of a vehicle V on which a vehicle control system 10 according to an embodiment of the present invention is mounted.

FIG. 1 is a diagram illustrating a configuration of a vehicle V on which a vehicle control system 10 according to the present embodiment is mounted.

The vehicle V includes drive wheels W, and a power supply system 1 that transfers electric power between a drive motor M coupled to the drive wheels W and a high-voltage battery BH described later. In the present embodiment, a case where the vehicle V is an electric vehicle that accelerates and decelerates mainly by power generated by the drive motor M will be described, and the present invention is not limited thereto. The vehicle V may be a so-called hybrid vehicle on which the drive motor M and an engine are mounted as power generation sources.

The drive motor M is coupled to the drive wheels W via a power transmission mechanism (not illustrated). A torque generated by the drive motor M by supplying three-phase AC power from the power supply system 1 to the drive motor M is transmitted to the drive wheels W via the power transmission mechanism (not illustrated) and rotates the drive wheels W, thereby causing the vehicle V to travel. Further, the drive motor M functions as a generator during deceleration of the vehicle V, generates regenerative electric power, and applies a regenerative braking torque corresponding to the magnitude of the regenerative electric power to the drive wheels W. The high-voltage battery BH and the low-voltage battery BL of the power supply system 1 is appropriately charged with the regenerative electric power generated by the drive motor M.

The power supply system 1 includes a high-voltage circuit 2 provided with the high-voltage battery BH, a low-voltage circuit 3 provided with the low-voltage battery BL, a voltage converter 4 that connects the high-voltage circuit 2 and the low-voltage circuit 3, and the vehicle control system 10 that controls the power supply system 1.

The high-voltage battery BH is a secondary battery capable of performing discharging of converting chemical energy into electric energy and charging of converting electric energy into chemical energy. The high-voltage battery BH is, for example, a so-called lithium-ion battery that performs charging and discharging by lithium ions moving between electrodes.

The low-voltage battery BL is a secondary battery capable of performing discharging of converting chemical energy into electric energy and charging of converting electric energy into chemical energy. Hereinafter, a case where a so-called lead battery in which lead dioxide is used for a positive electrode, spongy lead is used for a negative electrode, and dilute sulfuric acid is used as an electrolytic solution will be described as the low-voltage battery BL, and the invention is not limited thereto. A voltage of the low-voltage battery BL is lower than a voltage of the high-voltage battery BH. Therefore, a voltage of the high-voltage circuit 2 is higher than a voltage of the low-voltage circuit 3. The low-voltage battery BL is, for example, a 12 V battery or a 48 V battery.

The voltage converter 4 connects the high-voltage circuit 2 and the low-voltage circuit 3. The voltage converter 4 is a DCDC converter implemented by combining a switching element, a reactor, a smoothing capacitor, and the like, and has a function of converting a voltage between the high-voltage circuit 2 and the low-voltage circuit 3. The voltage converter 4 performs on/off drive of a switching element according to a gate drive signal generated at a predetermined timing from a gate drive circuit (not illustrated) based on a command from the vehicle control system 10, thereby stepping down electric power in the high-voltage circuit 2 and supplying the stepped-down electric power to the low-voltage circuit 3.

A power converter 21 and an in-vehicle charger 22 are connected to the high-voltage circuit 2.

The power converter 21 converts electric power between the high-voltage circuit 2 and the drive motor M. The power converter 21 is, for example, a PWM inverter based on pulse width modulation, and has a function of converting DC power and AC power. The power converter 21 is connected to the high-voltage circuit 2 on a DC input and output side, and is connected to the U-phase, V-phase, and W-phase coils of the drive motor M on an AC input and output side. The power converter 21 performs on/off drive of the switching elements of the respective phases according to a gate drive signal generated at a predetermined timing from a gate drive circuit (not illustrated) based on a command from the vehicle control system 10, thereby converting DC power in the high-voltage circuit 2 into three-phase AC power and supplying the three-phase AC power to the drive motor M, or converting three-phase AC power supplied from the drive motor M into DC power and supplying the DC power to the high-voltage circuit 2.

When the in-vehicle charger 22 is connected to, for example, a household or commercial AC power source (not illustrated), the in-vehicle charger 22 converts AC power supplied from the AC power source into DC power, supplies the DC power to the high-voltage circuit 2, and charges the high-voltage battery BH. At this time, it is also possible to charge the low-voltage battery BL by driving the voltage converter 4, stepping down the electric power in the high-voltage circuit 2, and supplying the stepped-down electric power to the low-voltage circuit 3. Hereinafter, charging of the high-voltage battery BH via the in-vehicle charger 22 is referred to as external charging.

A vehicle auxiliary device 31 and the vehicle control system 10 are connected to the low-voltage circuit 3. The vehicle auxiliary device 31 and the vehicle control system 10 operate by consuming electric power in the low-voltage circuit 3. The vehicle auxiliary device 31 includes a plurality of electrical components such as lamps, a car navigation system, an audio device, and an air compressor.

Figure 2:
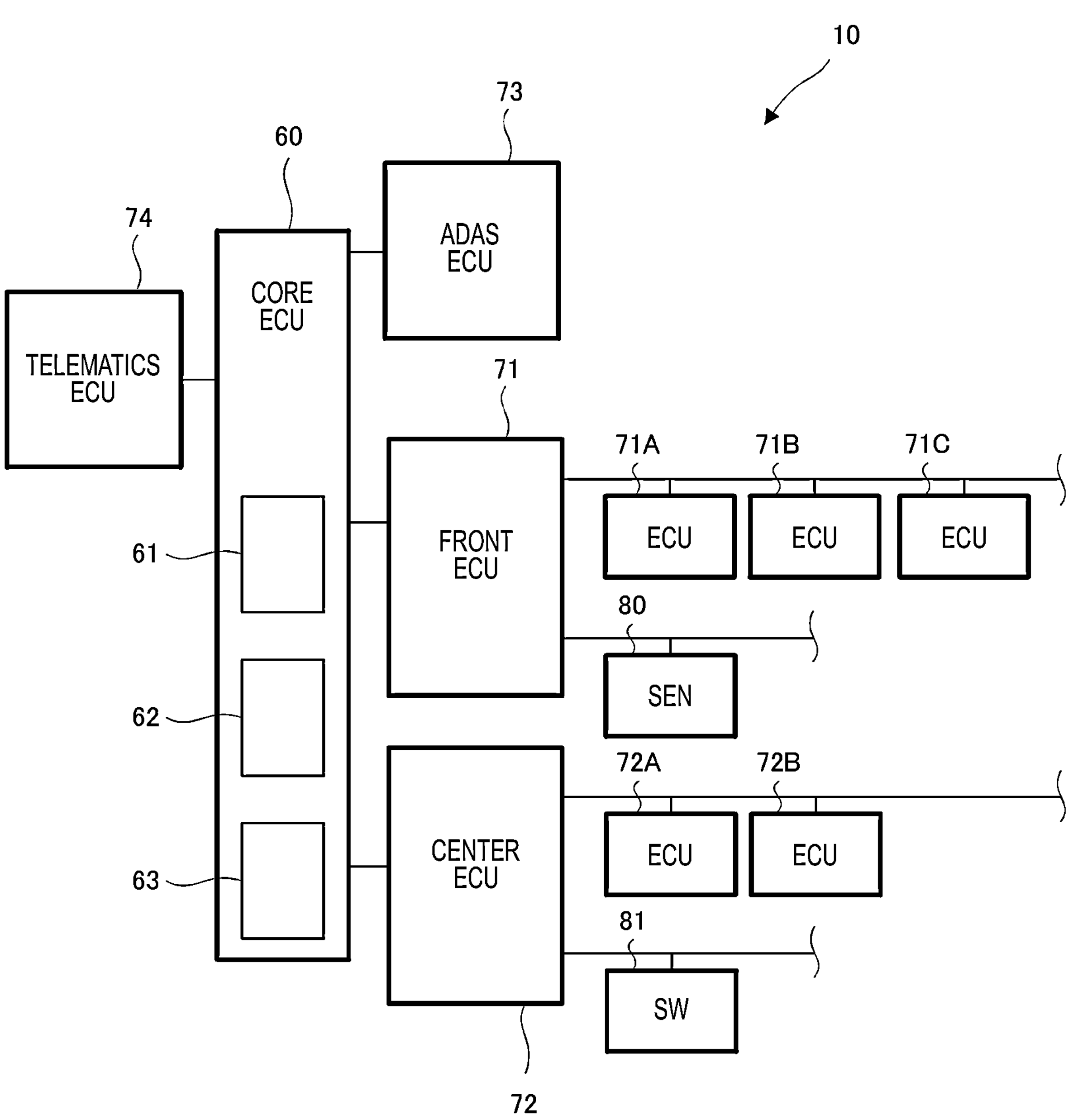
FIG. 2 is a diagram illustrating an example of a configuration of the vehicle control system 10.

FIG. 2 is a diagram illustrating a configuration of the vehicle control system 10.

The vehicle control system 10 includes in-vehicle ECUs provided according to positions or functions of the vehicle V and an integrated ECU that controls the in-vehicle ECUs, and the in-vehicle ECUs are connected to each other via an in-vehicle network that transfers various types of control information, and necessary control information can be transmitted and received therebetween. Examples of the in-vehicle network include a controller area network (CAN) communication network, a communication network conforming to a local interconnect network (LIN) or the like, and a communication network conforming to Ethernet (registered trademark). The vehicle control system 10 is configured to communicate with a mobile device, an FOB key, and the like by ultra wide band-impulse radio (UWB-IR) wireless communication, wireless communication through a mobile network, wireless LAN communication, BLE communication, or the like.

An electronic control unit (ECU) is an electronic substrate on which a peripheral IC, an external connection terminal, and the like are mounted around a microcontroller. The microcontroller is implemented by integrating a central processing unit (CPU), a memory, an interface (I/F), and the like.

A core ECU 60 serving as an integrated ECU includes a gateway portion 61, is communicably connected to the plurality of in-vehicle ECUs, and transmits an activation request to the in-vehicle ECUs when the core ECU 60 is activated. The core ECU 60 further includes a vehicle control unit 62 and a charging control unit 63, and performs overall control related to the vehicle based on information output from the in-vehicle ECUs.

The in-vehicle ECUs include, for example, a front ECU 71, a center ECU 72, and the like as ECUs provided according to positions of the vehicle V, and include, for example, an ADAS_ECU 73, a telematics ECU 74, and the like as ECUs provided according to functions of the vehicle V. The vehicle control system 10 has a cascade structure, and includes a first in-vehicle ECU 71A, a second in-vehicle ECU 71B, a third in-vehicle ECU 71C, and the like that are communicably connected to the front ECU 71, and a fourth in-vehicle ECU 72A, a fifth in-vehicle ECU 72B, and the like that are communicably connected to the center ECU 72.

The first in-vehicle ECU 71A, the second in-vehicle ECU 71B, the third in-vehicle ECU 71C, and the like communicably connected to the front ECU 71 are configured to exchange information with the core ECU 60 and the like via the front ECU 71. The fourth in-vehicle ECU 72A, the fifth in-vehicle ECU 72B, and the like communicably connected to the center ECU 72 are configured to exchange information with the core ECU 60 and the like via the center ECU 72.

The ADAS_ECU 73 is an ECU that performs control related to an advanced driver-assistance system (ADAS). The telematics ECU 74 is an ECU that performs wireless communication with the outside of the vehicle V. The first in-vehicle ECU 71A is, for example, an ECU that controls the high-voltage battery BH that stores electric energy for traveling of the vehicle V. The second in-vehicle ECU 71B is an ECU that controls the voltage converter 4 that converts a high voltage from the high-voltage battery BH into low-voltage electric power for charging the low-voltage battery BL. The third in-vehicle ECU 71C is an ECU that controls the in-vehicle charger 22 that charges the high-voltage battery BH.

The fourth in-vehicle ECU 72A is a smart ECU that detects approach of an FOB key and a switch operation of the FOB key. The fifth in-vehicle ECU 72B is a power supply ECU that controls, based on a request from the core ECU 60, on and off states of a traveling power supply mounted on the vehicle V. The in-vehicle ECUs described above are merely examples, and the invention is not limited thereto, and other ECUs may be provided, and some of the in-vehicle ECUs may not be provided.

The front ECU 71 is communicably connected to a low-voltage battery sensor 80 connected to the low-voltage battery BL, and transmits information acquired from the low-voltage battery sensor 80 to the core ECU 60. The center ECU 72 is connected to a start switch 81, which is a push switch for the user to switch on/off the traveling power supply, and detects pressing of the start switch 81 and transmits a detection result to the core ECU 60.

Figure 3:
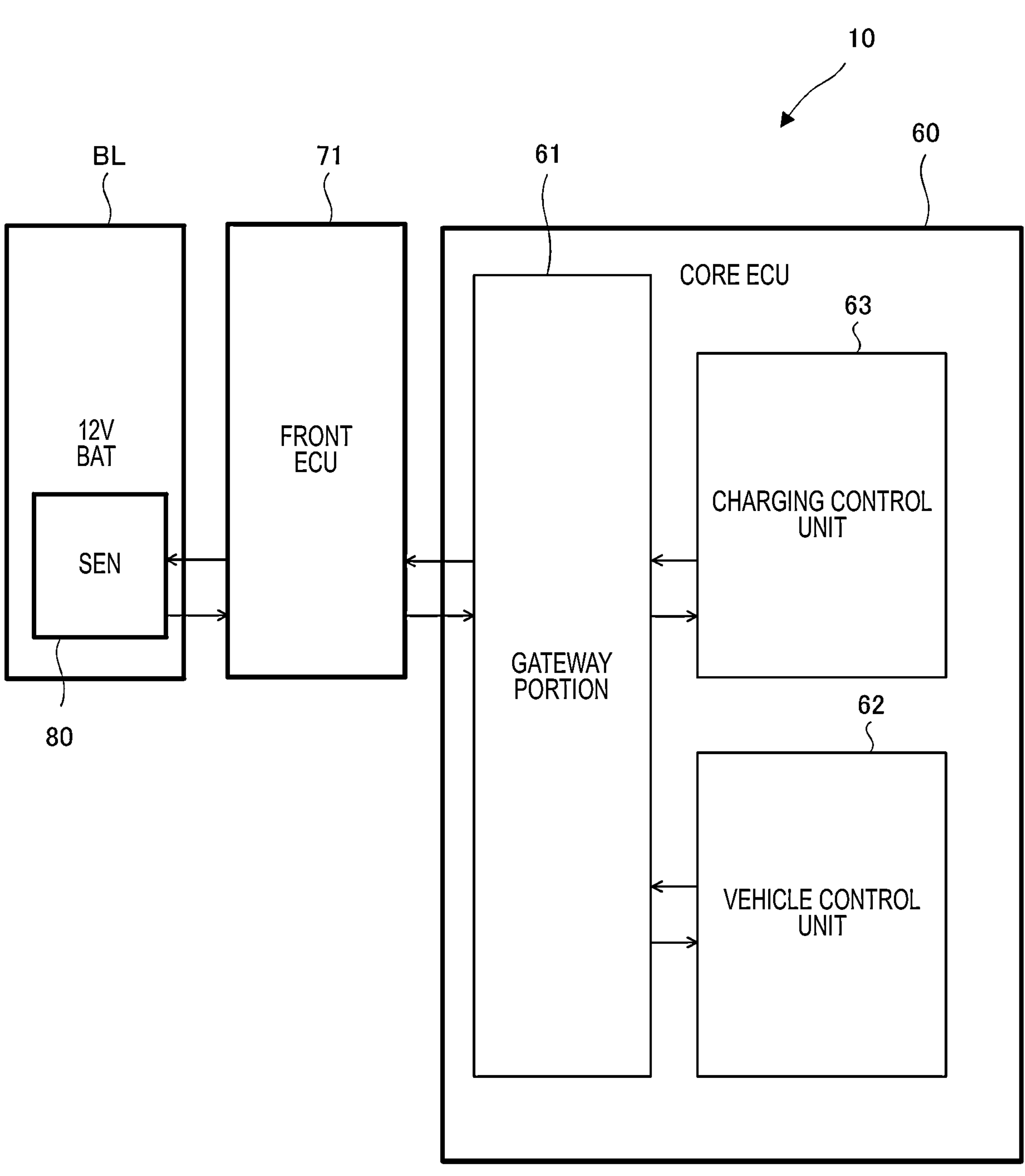
FIG. 3 is a diagram illustrating a main part of the vehicle control system 10 in FIG. 2.

The low-voltage battery sensor 80 detects a physical quantity necessary for the core ECU 60 to estimate a charging rate of the low-voltage battery BL (a power storage amount of the battery expressed in percentage), and transmits a signal corresponding to a detection value to the front ECU 71. More specifically, as illustrated in FIG. 3, the low-voltage battery sensor 80 detects a terminal voltage of the low-voltage battery BL, a current flowing through the low-voltage battery BL, an integrated dark current (integrated dark discharge amount) obtained by integrating the dark current from the low-voltage battery BL during a stop period of the vehicle V, and a temperature of the low-voltage battery BL, and transmits detection values to the front ECU 71. The core ECU 60 receives a signal transmitted from the low-voltage battery sensor 80 via the front ECU 71, and calculates the charging rate of the low-voltage battery BL according to a known algorithm based on this information.

The charging control unit 63 of the core ECU 60 performs control related to monitoring of the states of the high-voltage battery BH and the low-voltage battery BL and charging control of the low-voltage battery BL. In the charging control of the low-voltage battery BL, the voltage converter 4 is operated to execute charging control of charging the low-voltage battery BL with electric power in the high-voltage circuit 2. The charging control unit 63 can selectively execute, as such charging control of the low-voltage battery BL, normal charging control and auxiliary charging control. In the normal charging control, the low-voltage battery BL is charged by operating the voltage converter 4 during traveling of the vehicle, stepping down the electric power in the high-voltage circuit 2, and supplying the stepped-down electric power to the low-voltage circuit 3. In the auxiliary charging control, the low-voltage battery BL is charged by operating the voltage converter 4 during stop of the vehicle, stepping down the electric power in the high-voltage circuit 2, and supplying the stepped-down electric power to the low-voltage circuit 3.

The vehicle control unit 62 of the core ECU 60 performs control related to reception of a vehicle start/stop operation, a vehicle door lock operation, a vehicle entry operation, and the like. The vehicle control unit 62 receives an on operation or an off operation performed by the user for starting or stopping the vehicle V, based on signals transmitted from the start switch 81 and the like. The on operation refers to an operation in which the user presses the start switch 81 for starting the vehicle V in a traveling mode. When the core ECU 60 receives the on operation performed by the user, the core ECU 60 starts the vehicle V in the traveling mode and brings the vehicle V into a travelable state. The off operation is an operation in which the user presses the start switch 81 to stop the vehicle V. When the off operation performed by the user is received, the vehicle control unit 62 stops the vehicle V (sets to an ignition off state in the case of an engine vehicle).

Here, in the vehicle V on which a large number of ECUs are mounted, if all the ECUs are always in an operating state when the vehicle V is in a stopped state, electric power consumed by the ECUs increases, a dark current from the low-voltage battery BL increases, and a state of charge (SOC) of the low-voltage battery BL decreases. Therefore, it is conceivable to shift the ECU to a low power consumption state (hereinafter, referred to as a sleep state) in which power consumption is less than that in a normal operating state. However, the ECU in the sleep state needs to be woken up (activated) before executing an operation. Therefore, there is a concern that the responsiveness may decrease when the ECU is shifted to the low power consumption state. The low power consumption state may include states called a sleep mode, a deep sleep mode, a shutdown mode, a stop mode, and the like depending on power consumption, and these states are hereinafter referred to as a sleep state without distinction.

It takes a predetermined time for each ECU to shift from the sleep state to the normal operating state after detecting a wake-up signal. Referring this time as an activation time, a length of the activation time varies depending on the type, function, specification, and the like of the ECU.

Figure 4:
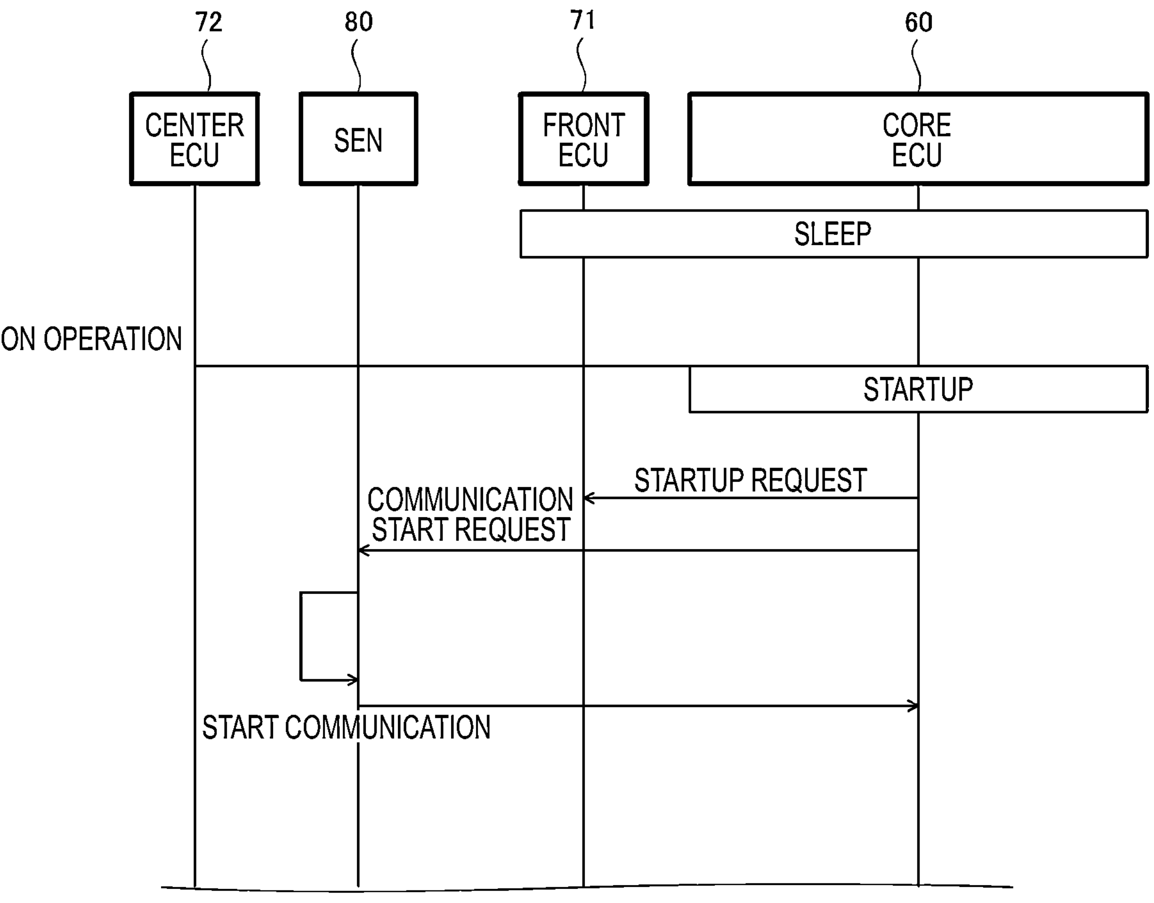
FIG. 4 is a diagram illustrating a flow at the time of staring the vehicle V.

Therefore, as illustrated in FIG. 4, when the core ECU 60 receives an on operation on the start switch 81, the core ECU 60 secures communication in the vehicle V, and thereafter activates the front ECU 71 and starts communication of the low-voltage battery sensor 80.

The core ECU 60 and the front ECU 71 are in a sleep state when the vehicle V is in a stopped state. When the core ECU 60 receives an on operation from the center ECU 72 at the time of start of the vehicle V, the core ECU 60 itself is activated from the sleep state to shift to the normal operating state. In order to secure the communication in the vehicle, the core ECU 60 transmits, for example, a control signal for communication to each connected ECU or transmits an activation request to each ECU. The core ECU 60 transmits an activation request to the front ECU 71 and transmits a communication start request to the low-voltage battery sensor 80 via the front ECU 71. The low-voltage battery sensor 80 that receives the communication start request outputs information on a state of the low-voltage battery BL, that is, a voltage, a current, and an integrated dark current to the core ECU 60 via the front ECU 71.

The core ECU 60 receives the voltage, the current, and the integrated dark current from the low-voltage battery sensor 80 via the front ECU 71, and estimates the SOC of the low-voltage battery BL. When the SOC of the low-voltage battery BL is less than a predetermined value, the core ECU 60 operates the voltage converter 4 to step down the electric power in the high-voltage circuit 2 and supply the stepped-down electric power to the low-voltage circuit 3, thereby charging the low-voltage battery BL.

As described above, when the vehicle V is started, in other words, when the core ECU 60 is activated by receiving an on operation of the start switch 81, the core ECU 60 activates the front ECU 71, and starts the communication of the low-voltage battery sensor 80 in parallel with the activation of the front ECU 71, whereby the core ECU 60 can grasp the state of the low-voltage battery BL at an early stage and start the vehicle V at an early stage.

When the low-voltage battery sensor 80 is in the sleep state while the vehicle V is stopped, the core ECU 60 activates the front ECU 71 and activates the low-voltage battery sensor 80 in parallel with the activation of the front ECU 71 to start communication thereof. Accordingly, the vehicle V can be started at an early stage. Since the electric power of the low-voltage battery necessary for failure diagnosis by on-board diagnostics (OBD) performed at the time of vehicle startup is secured at an early stage, the time required for startup can be shortened by parallel operation.

Although a lead battery is exemplified as the low-voltage battery BL in the above-described embodiment, the low-voltage battery BL is preferably a lithium-ion battery. The lithium-ion battery is generally configured such that the low-voltage battery sensor 80 is unitized and an SOC at the time when the vehicle V is stopped can be detected by its own monitoring system. Therefore, control by the core ECU 60 is easier than in the case of a lead battery. The lead battery tends to suffer battery exhaustion near a timing of regular replacement, but the lithium-ion battery has a long lifespan, and thus it is possible to reduce the user's concern about battery exhaustion.

Although various embodiments have been described above with reference to the drawings, it is needless to say that the present invention is not limited to these examples. It is apparent that those skilled in the art can conceive of various modifications and changes within the scope described in the claims, and it is understood that such modifications and changes naturally fall within the technical scope of the present invention. In addition, respective constituent elements in the above-described embodiments may be freely combined without departing from the gist of the invention.

In the present specification, at least the following matters are described. Although corresponding constituent elements or the like in the embodiment described above are shown in parentheses, the present invention is not limited thereto.

(1) A vehicle control system (vehicle control system 10) including:

in-vehicle ECUs provided according to positions or functions of a vehicle (vehicle V); and an integrated ECU (core ECU 60) configured to control the in-vehicle ECUs, in which the in-vehicle ECUs include an ECU (front ECU 71) capable of communicating with an auxiliary battery sensor (low-voltage battery sensor 80) configured to detect a state of an auxiliary battery (low-voltage battery BL), the auxiliary battery sensor is configured to transmit a state of the auxiliary battery to the integrated ECU via the ECU, and when starting the vehicle, the integrated ECU secures communication in the vehicle, and activates the ECU, and starts communication of the auxiliary battery sensor in parallel.

According to (1), since the communication in the vehicle is secured at the time of starting the vehicle, the ECU is activated, and the communication of the auxiliary battery sensor is started, it is possible to start the vehicle at an early stage.

(2) The vehicle control system according to (1), in which the auxiliary battery sensor detects at least one of a voltage, a current, and an integrated dark current of the auxiliary battery.

According to (2), an SOC of the auxiliary battery can be calculated by the integrated ECU.

(3) A vehicle control system (vehicle control system 10) including:

an integrated ECU (core ECU 60) configured to integrally control in-vehicle ECUs provided according to positions or functions of a vehicle (vehicle V), in which the in-vehicle ECUs include a relay ECU (front ECU 71) capable of communicating with an auxiliary battery sensor (low-voltage battery sensor 80) configured to detect a state of an auxiliary battery (low-voltage battery BL), when the integrated ECU is activated, the integrated ECU transmits an activation request to the relay ECU, and transmits a communication start request to the auxiliary battery sensor via the relay ECU.

According to (3), when the integrated ECU is activated, the integrated ECU transmits the activation request to the relay ECU and transmits the communication start request to the auxiliary battery sensor via the relay ECU, and thus it is possible to start the vehicle at an early stage.

(4) The vehicle control system according to any one of (1) to (3), in which the auxiliary battery is a lithium-ion battery.

According to (4), since the lithium-ion battery can detect an SOC decrease during the stop by its own monitoring system, control by the integrated ECU is easy. The lead battery tends to suffer battery exhaustion near a timing of regular replacement, but the lithium-ion battery has a long lifespan, and thus it is possible to reduce the user's concern about battery exhaustion.

(5) The vehicle control system according to (4), in which the integrated ECU receives information on the auxiliary battery and executes charging control of the auxiliary battery.

According to (5), when the amount of a dark current discharged from the auxiliary battery during stop of the vehicle is large, the charging control of the auxiliary battery is executed, so that it is possible to restrict the battery exhaustion of the auxiliary battery.

REFERENCE SIGNS LIST

10: vehicle control system
60: core ECU (integrated ECU)
71: front ECU (ECU, relay ECU, in-vehicle ECU)
80: low-voltage batter sensor
BL: low-voltage battery
V: vehicle

What is claimed is:

1. A vehicle control system comprising:

in-vehicle ECUs provided according to positions within a vehicle or functions of the vehicle; and an integrated ECU configured to control the in-vehicle ECUs, wherein the in-vehicle ECUs comprise a front ECU capable of communicating with an auxiliary battery sensor configured to detect a state of an auxiliary battery, the auxiliary battery sensor is configured to transmit the state of the auxiliary battery to the integrated ECU via the front ECU, and when starting the vehicle, the integrated ECU secures communication in the vehicle by transmitting an activation request to each of the in-vehicle ECUs, and activates the front ECU, and transmits, via the front ECU, a communication start request to the auxiliary battery sensor to start communication of the auxiliary battery sensor in parallel.

2. The vehicle control system according to claim 1, wherein the auxiliary battery sensor is configured to detect at least one of a voltage, a current, or an integrated dark current of the auxiliary battery.

3. A vehicle control system comprising:

an integrated ECU configured to integrally control in-vehicle ECUs provided according to positions within a vehicle or functions of the vehicle, wherein the in-vehicle ECUs comprise a relay ECU capable of communicating with an auxiliary battery sensor configured to detect a state of an auxiliary battery, and when the integrated ECU is activated, the integrated ECU transmits an activation request to each of the in-vehicle ECUs including the relay ECU to activate the relay ECU, and transmits, via the relay ECU, a communication start request to the auxiliary battery sensor to start communication of the auxiliary battery sensor.

4. The vehicle control system according to claim 1, wherein the auxiliary battery is a lithium-ion battery.

5. The vehicle control system according to claim 2, wherein the auxiliary battery is a lithium-ion battery.

6. The vehicle control system according to claim 3, wherein the auxiliary battery is a lithium-ion battery.

7. The vehicle control system according to claim 4, wherein the integrated ECU is configured to receive information on the auxiliary battery and execute charging control of the auxiliary battery.

8. The vehicle control system according to claim 5, wherein the integrated ECU is configured to receive information on the auxiliary battery and execute charging control of the auxiliary battery.

9. The vehicle control system according to claim 6, wherein the integrated ECU is configured to receive information on the auxiliary battery and execute charging control of the auxiliary battery.

* * * * *